(12) United States Patent
D'Amato

(10) Patent No.: US 10,715,646 B2
(45) Date of Patent: Jul. 14, 2020

(54) SMARTPHONE WITH WALLET AND KEYCHAIN FUNCTIONS

(71) Applicant: Danilo D'Amato, Castel di Sangro (IT)

(72) Inventor: Danilo D'Amato, Castel di Sangro (IT)

( * ) Notice: Subject to any disclaimer, the term of this patent is extended or adjusted under 35 U.S.C. 154(b) by 0 days.

(21) Appl. No.: 16/474,082

(22) PCT Filed: Jun. 26, 2017

(86) PCT No.: PCT/IT2017/000131
§ 371 (c)(1),
(2) Date: Jun. 27, 2019

(87) PCT Pub. No.: WO2018/173080
PCT Pub. Date: Sep. 27, 2018

(65) Prior Publication Data
US 2019/0327353 A1   Oct. 24, 2019

(30) Foreign Application Priority Data
Mar. 22, 2017   (IT) .................. 202017000031414

(51) Int. Cl.
*H04M 1/21* (2006.01)
*H04M 1/02* (2006.01)
(52) U.S. Cl.
CPC ........... *H04M 1/21* (2013.01); *H04M 1/0216* (2013.01)
(58) Field of Classification Search
CPC ........ A45C 2011/002; A45C 2011/007; A45C 11/182; A45C 11/321; A45C 13/02; A45C 2001/006; A45C 2001/026; A45C 2001/086; A45C 2013/1015; A45C 15/00; A45C 1/06; A45C 3/001; A45C 7/0036; A45C 11/00; H04B 1/3888; H04B 1/3877; H04B 1/38; H04B 1/385;
(Continued)

(56) References Cited

U.S. PATENT DOCUMENTS 6,259,932 B1   7/2001   Constien
6,850,780 B1   2/2005   Gioscia
(Continued)

FOREIGN PATENT DOCUMENTS

EP   2342889   9/2015

OTHER PUBLICATIONS

CN201726445 English translation.pdf Jan. 2011—p. 1, obtained from google translation (Year: 2011).*

(Continued)

*Primary Examiner* — Nimesh Patel
(74) *Attorney, Agent, or Firm* — Nath, Goldberg & Meyer; Joshua B. Goldberg

(57) ABSTRACT

The present invention relates to the innovation of an ordinary openable smartphone, so that while maintaining its electronic functionality, it can also internally integrate the wallet and keychain functions. Thanks to a structure with the wallet function, consisting of a multi compartment pocket able to expand when opening the smartphone and to retreat when closing. And thanks to a further structure, there is the keychain function, consisting of small flexible hooks made with a knurled system that blocks the keys.
The wallet and keychain functions will be accessible by pushing an external button that opens the smartphone into two parts, like a book.

3 Claims, 2 Drawing Sheets

(58) Field of Classification Search
CPC ........ H04B 2001/3855; H04M 1/0268; H04M 1/0216; H04M 1/04; H04M 1/21; H04M 1/0214; H04M 1/0202; H04M 1/0247; H04M 1/0279; H04M 1/0245; H04M 1/72522; H04M 1/6041; H04M 2250/22; H04M 1/02; H04M 1/0254; H04M 1/605; H04M 1/0218; H04M 1/0283; H04M 1/72575; G06F 1/1626; G06F 1/1632; G06F 1/1643; G06F 1/1652; G06F 2203/04102; G06F 1/1616; G06F 1/1624; A61B 5/6898
See application file for complete search history.

(56) References Cited

U.S. PATENT DOCUMENTS

| | | | |
|---|---|---|---|
| 7,079,875 B2 | 7/2006 | Robertson, Jr. | |
| 7,158,634 B2 | 1/2007 | Eromäki | |
| 7,200,224 B2 | 4/2007 | Park | |
| 7,257,430 B2 | 8/2007 | Lenchik | |
| 7,447,527 B2 | 11/2008 | Lin | |
| 7,522,944 B2 | 4/2009 | Hyun | |
| 7,574,241 B2 | 8/2009 | Ahn | |
| 9,176,527 B2 | 11/2015 | Lee | |
| 10,110,717 B1* | 10/2018 | Liu | H04M 1/0216 |
| 10,558,928 B2* | 2/2020 | Myslinski | G06N 5/048 |
| 2005/0091431 A1 | 4/2005 | Olodort | |
| 2005/0277453 A1 | 12/2005 | Kim | |
| 2006/0100004 A1 | 5/2006 | Kim | |
| 2007/0029225 A1 | 2/2007 | Ko | |
| 2012/0236484 A1 | 9/2012 | Miyake | |
| 2013/0095725 A1* | 4/2013 | Von Mohr | A63H 3/48 446/321 |
| 2014/0126133 A1* | 5/2014 | Griffin | G06F 1/1616 361/679.27 |
| 2018/0294845 A1* | 10/2018 | Bimbaud | H04M 1/0202 |

OTHER PUBLICATIONS

CN201726445 Mobile_Phone_Wallet_google_patents.pdf Jan. 2011—pp. 4, obtained from google patents (Year: 2011).*

* cited by examiner

US 10,715,646 B2

SMARTPHONE WITH WALLET AND KEYCHAIN FUNCTIONS

CROSS REFERENCE TO RELATED APPLICATIONS

This application is a U.S. National Phase filing under 35 U.S.C. § 371 of PCT/IT2017/000131, filed on Jun. 26, 2017, which claims priority to Italian Patent Application No. IT202017000031414 filed on Mar. 22, 2017.

TECHNICAL FIELD

The present invention relates to a smartphone. In particular, the invention relates the functions of wallet and keychain to the smartphone internally, thanks to an expandable multi compartment pocket and small flexible couples of knurled hooks.

BACKGROUND OF THE INVENTION

The smartphone, which is opened in two parts, like a book, is being marketed and has been known for several years, for example, the model with the keyboard in a part and the display in the other one, or the foldable model with two screens that form a single large display. There are also several inventions for an openable smartphone with internal accommodation spaces. Of course, due to the nature of the smartphone, the internal compartments are indispensable for housing the battery and all other electronic elements that allow it to work properly. The European Patent No. EP2342889 with priority to International Application No. PCT/EP2008/065015 by Iris Papenmeier, titled "mobile telephone housing structure having a receptacle", describes a mobile telephone with a receptacle, in which an object not required for the proper use of the mobile telephone can be received.

The receptacle is described to accommodate every type of small object but then gives much importance to the description of a receptacle able to store medicine for healthcare. The invention describes a dynamic receptacle that can slide from inside the smartphone to the outside, on the lower right side, but it also can slide to the external bottom side of the smartphone. The dynamic receptacle can slide out of the smartphone in a straight way, but it can also rotate to the bottom or open in a tilting way. Furthermore, the receptacle can also be static inside the smartphone. In this case, it may be free at the top, or it may have a sliding protective cover. It can be large for the entire length of the smartphone or can be small in the bottom.

When the receptacle is static inside the smartphone, access can only be gained by opening the smartphone. In this case, the smartphone described in EP patent No. EP2342889 can be opened like a book on one side, but it can also be opened by sliding it upwards vertically or by rotating it in a circle with the upper part joined. In addition, described by Iris Papenmeier is also a receptacle in which a key or credit card can be inserted into the smartphone from the outside towards the inside and vice versa when the smartphone is closed. Papenmeier describes a smartphone that opens in very several different ways and describes many types of receptacles, internally to the smartphone, that can be dynamic (when moved from inside to outside) or static (when only inside).

However, a drawback is that all the embodiments disclosed in EP patent No. EP2342889 show a receptacle that is an empty space inside the phone (in the static version) or a sliding empty drawer (in the dynamic version). It is obvious there is a function and, above all, a safety problem. In fact, every type of item that is hosted by the empty receptacle is free to move when the smartphone (close) is used for its own generic functions. In practice, there isn't a structure inside the receptacle that blocks the items internally in a safe way. The same problems are encountered for the German application No. DE112011105343 with Priority to PCT/EP2011/060164 by the same inventor cited above, Iris Papenmeier.

U.S. Patent Application Publication No. US 20050136996 by Robertson, Jr. William H. titled "Housing assembly with biased and removable door" describes an old mobile phone (not a smartphone) with a door with removable to access to the internal compartments. The invention concerns the possibility to access the hardware elements essential for the operation of the phone, such as the battery. The patent does not describe any structure inside the compartment able to host, in a safe way, optional items or different pieces required for the proper use of the phone.

U.S. Patent Application Publication No. US 20070029225 A1 by Chuan KoHong-Da Liu, titled "Portable information device combined with a cosmetic container", describes a device that comprises a machine and a tray with slots that contain cosmetic products or body care products. Application status is "Abandoned". Some previous patents, instead, concern a removable custody or external cover secured to a portable electronic device. It follows that many prior patents have suffered from instability of the objects hosted inside the smartphone and, as a consequence, not safely used in the smartphone. Furthermore, the prior patents don't describe the precise structures with internal access, having only the functions of wallet and keychain. There is therefore room for improvement.

SUMMARY OF THE INVENTION

All smartphones have internal compartments able to host the circuits and electronic pieces required for proper use. Some smartphones do not allow access to their internal parts; while others have a removable cover or door to gain access to their internal electronic parts. How can I place the content of an ordinary wallet inside a smartphone, such as banknotes, credit cards, id document, driver license, similar items, and a key for opening locks, padlocks, and doors? How do I innovate an ordinary smartphone that, while maintaining its own electronic functionality and without using any external custody or removable cover, it can have the internal functions of wallets and keychains?

The goal of the present invention is not only to place the items cited above inside the smartphone, but to find a solution to solve the instability suffered from the prior patents and find a way safely to lock and keep the items still internally when the smartphone is normally used. So, there is a need to place a precise structure within a compartment.

To this end, the present invention begins to place a pocket made with multiple compartments (having the wallet function) within a space inside the smartphone. Inspired by the movement of the central part of a generic accordion, the multi compartment pocket is made to expand when opening the smartphone and to retreat when the closing. In this way, every compartment of the pocket is independent and can host all slim items usually placed into a wallet. The expandable movement of the multi compartments, when the smartphone is opening, allows to take all the items hosted. While the retractable movement of the multi compartments, when the smartphone is closing, allows to block the items inside it safely. In this way, the only possibility to take the items from the multi compartments (wallet) is when the smartphone is open.

Furthermore, couples of small flexible hooks able to host keys are fixed within a further independent compartment inside the smartphone. The hooks are made with a knurled system able to block the keys when the smartphone is close, while the flexible system allows to release the keys when the smartphone is open. In this way, like the wallet items, the only possibility to take out the keys is when the smartphone is open. The wallet and keychain function is possible to access when opening the smartphone in two parts, in the manner of a laptop, that will remain united only on its own longest side. After that, the two parts can be overlapped and blocked when the smartphone is closed.

DETAILED DESCRIPTION OF PREFERRED EMBODIMENT

Figure 1:
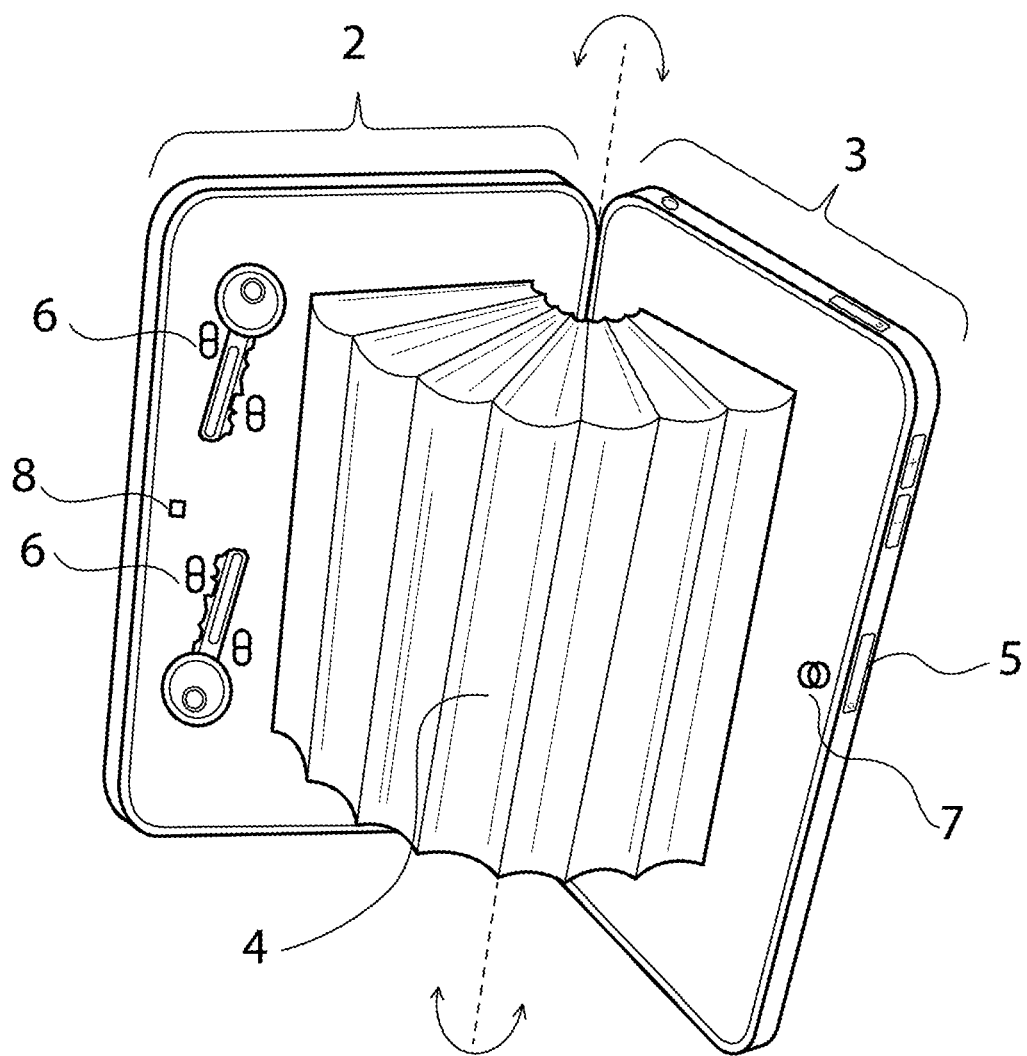
FIG. 1 illustrates the internal parts of the smartphone when it is open. The smartphone is shown standing vertically.
Figure 2:
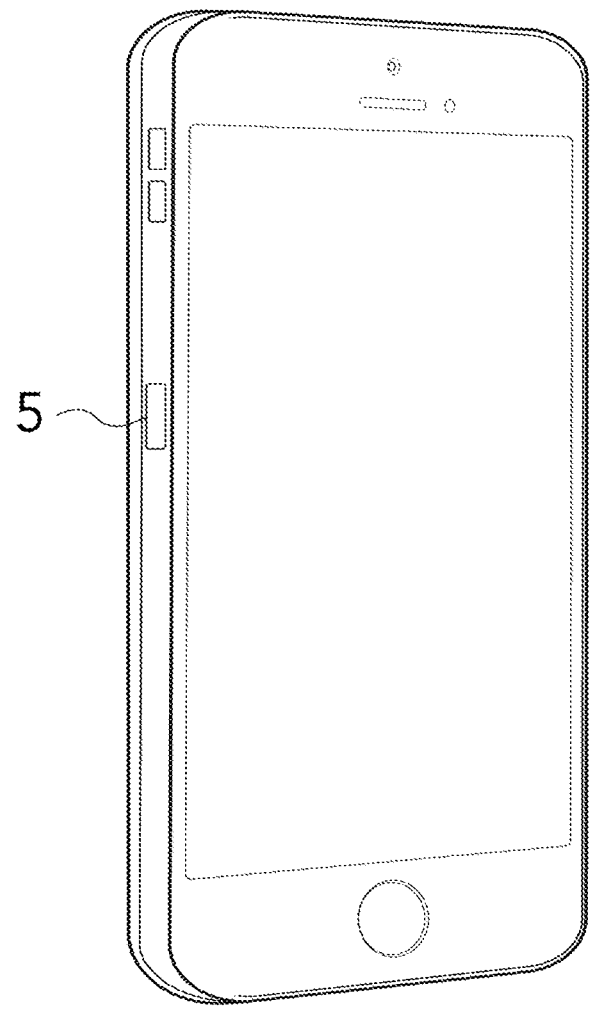
FIG. 2 illustrates the front of the smartphone standing vertically, when the smartphone is closed.

As shown in FIG. 1, a button 5 placed on the external side of the smartphone is colligated to the internal female hook 7. The female hook 7 is made to receive the male hook 8. When the hooks 7 and 8 are united, the smartphone remains closed. Pushing the button 5, the hooks 7 and 8 unlock and the smartphone can be opened into two parts, 2 and 3. When the smartphone is open, the parts 2 and 3 will be united only on one of their own longest sides, by an internal hinge that allows rotation. When the smartphone is closed, the parts 2 and 3 will remain perfectly superimposed. The part 2 corresponds externally to the rear of the smartphone. The part 3 corresponds externally to the front of the smartphone, where the display is usually placed.

A pocket consisting of several compartments 4 is collocated internally in the smartphone, at center, between parts 2 and 3. The multi compartment pocket 4 has the wallet function. The multi compartment 4 is made of a single long piece, folded in equal measures overlapped, able to expand when opening the smartphone and to retreat when closing. So, between the left and the right side of the pocket, there are multiple independent compartments, each one connected to the next. Every compartment has an opening from the upper side able to receive all the items usually hosted in a wallet.

Inspired by the movement of the central part of a generic accordion, the expandable movement of the multi compartment pocket (when the smartphone is opening) allows to move all the items hosted. While the retractable movement of the multi compartment pocket (when the smartphone is closing) allows to block the items inside it safely and to use the smartphone without danger of internal objects moving.

In this way, the only possibility to take the items from the multi compartments is when the smartphone is open. The multi compartment pocket 4 is fixed (internally the smartphone) on its first left side to part 2 and on its last right side to part 3.

Furthermore, couples of small flexible hooks 6 able to host keys are fixed internally in the smartphone on part 2. The hooks are made with a knurled system to block the keys safely when the smartphone is closed and allows to use the smartphone without danger of internal objects moving, while the flexible material allows to release the keys when the smartphone is open. In this way, like the wallet items, the only possibility to take the keys from the hooks is when the smartphone is open. The couples of small flexible hooks 6, made with a knurled system, have the keychain function. Each key can be inserted in a fast and easy way by pushing it between the couple of parallel hooks 6. Each key can be removed in a fast and easy way by flexing the hooks 6.

The goal of the present invention is to provide a niche openable smartphone, with the optional internal functions of wallet and keychain, while maintaining its electronic functionality. And to provide the structures within compartments, it must be able to host the respective items safely. Those skilled in the art, after having the benefit of this disclosure, will appreciate that modifications and changes may be made to the embodiment described herein; different materials may be substituted, equivalent features may be used, changes may be made in the steps of manufacturing processes, and additional elements and steps may be added, all without departing from the scope and spirit of the invention.

The invention claimed is:

1. A smartphone openable into two parts, comprising:
a smartphone having first and second parts, the first part having opposed outer and inner faces, and the second part having opposed inner and outer faces, the second part being pivotally joined, along one edge thereof, to the inner face of the first part, the inner face of the second part being selectively and releasably lockable against the inner face of the first part;
an expandable multi-compartment pocket secured to the inner face of the second part and the inner face of the first part, the expandable multi-compartment pocket being expandable therebetween; and
at least one pair of flexible knurled hooks secured to the inner face of the second part, the at least one pair of flexible knurled hooks being configured to releasably receive at least one key therebetween.

2. The smartphone openable into two parts of claim 1, further comprising first and second locking members respectively secured to the first part and the second part for selectively and releasably locking the inner face of the second part to the inner face of the first part.

3. The smartphone openable into two parts of claim 1, wherein the expandable multi-compartment pocket comprises an accordion-folded sheet.

* * * * *